(12) United States Patent
Lori

(10) Patent No.: US 8,875,301 B2
(45) Date of Patent: Oct. 28, 2014

(54) SOFTWARE LICENSE INCOMPATIBILITY DETERMINATION

(75) Inventor: Giancarlo Lori, Rome (IT)

(73) Assignee: Hewlett-Packard Development Company, L. P., Houston, TX (US)

( * ) Notice: Subject to any disclaimer, the term of this patent is extended or adjusted under 35 U.S.C. 154(b) by 374 days.

(21) Appl. No.: 13/271,538

(22) Filed: Oct. 12, 2011

(65) Prior Publication Data

US 2013/0097712 A1 Apr. 18, 2013

(51) Int. Cl.
*G06F 21/10* (2013.01)

(52) U.S. Cl.
CPC .................................... *G06F 21/105* (2013.01)
USPC .................... 726/26; 726/30; 726/33; 705/51

(58) Field of Classification Search
CPC ..... G06F 21/10; G06F 21/105; H04N 21/835; H04N 21/2541; H04N 21/4627
USPC ................... 726/26, 30–33; 713/189
See application file for complete search history.

(56) References Cited

U.S. PATENT DOCUMENTS

| | | | |
|---|---|---|---|
| 7,197,466 B1 * | 3/2007 | Peterson et al. | 705/59 |
| 7,552,093 B2 | 6/2009 | Levin et al. | |
| 7,552,429 B2 * | 6/2009 | Dettinger et al. | 717/162 |
| 7,818,262 B2 * | 10/2010 | Kavuri et al. | 705/59 |
| 7,870,075 B1 | 1/2011 | Sabet | |
| 8,401,925 B1 * | 3/2013 | Klein et al. | 705/26.62 |
| 8,572,093 B2 * | 10/2013 | Weigert et al. | 707/748 |
| 2003/0212905 A1 | 11/2003 | Tran et al. | |
| 2004/0068734 A1 * | 4/2004 | Bond et al. | 719/328 |
| 2004/0073789 A1 | 4/2004 | Powers | |
| 2004/0143713 A1 | 7/2004 | Niles et al. | |
| 2004/0143746 A1 | 7/2004 | Ligeti et al. | |
| 2006/0059099 A1 | 3/2006 | Ronning et al. | |
| 2006/0059100 A1 | 3/2006 | Ronning et al. | |
| 2006/0059561 A1 | 3/2006 | Ronning et al. | |
| 2007/0271190 A1 | 11/2007 | Foster | |
| 2008/0114693 A1 * | 5/2008 | Jogand-Coulomb et al. | 705/59 |
| 2008/0133324 A1 | 6/2008 | Jackson et al. | |
| 2008/0209399 A1 | 8/2008 | Bonnet et al. | |
| 2008/0320455 A1 | 12/2008 | Spurlin | |
| 2009/0031286 A1 | 1/2009 | Yee et al. | |
| 2009/0228984 A1 | 9/2009 | Sterin | |
| 2010/0185686 A1 * | 7/2010 | Weigert et al. | 707/803 |
| 2010/0251379 A1 | 9/2010 | Myers et al. | |
| 2011/0023123 A1 | 1/2011 | King et al. | |
| 2011/0131134 A1 | 6/2011 | Ferris et al. | |

(Continued)

OTHER PUBLICATIONS

Alspaugh et al., "Analyzing Software Licenses in Open Architecture Software Systems," FLOSS'09, May 18, 2009, Vancouver, Canada, ICSE'09 Workshop, 4 p.

(Continued)

*Primary Examiner* — Amare F Tabor

(57) ABSTRACT

A non-transitory storage device stores instructions that, when executed by a hardware processor, causes the hardware processor to receive from an input device. The input identifies software licenses for software components to be included in an application. The instructions also cause the hardware processor to receive usage information identifying how the application is to be used and to determine whether an incompatibility exists between any of the software licenses for the software components and the usage information. Based on a determination of the existence of an incompatibility, the instructions cause the hardware processor to display a recommendation as to how to avoid the incompatibility.

17 Claims, 4 Drawing Sheets

(56) References Cited

U.S. PATENT DOCUMENTS

2011/0131315 A1    6/2011  Ferris et al.
2012/0166619 A1*  6/2012  Mefford et al. ............... 709/224
2013/0247209 A1*  9/2013  Didcock et al. ................ 726/26
2013/0305381 A1*  11/2013  Gordon et al. ................. 726/26

OTHER PUBLICATIONS

Zhang et al., "Automatic Checking of License Compliance," 26th IEEE International Conference on Software Maintenance in Timisoara, Romania, School of Software Tsinghua University, Oct. 24, 2010, 3 p.

* cited by examiner

SOFTWARE LICENSE INCOMPATIBILITY DETERMINATION

BACKGROUND

When writing source code, a developer may use already-written segments of code rather than creating such functionality from scratch. Often, the segments of code that are to be incorporated into the developer's application are subject to an open source software (OSS) license. Many different types of OSS licenses exist and the terms of the licenses vary from license to license. The increasing use of software that is subject to OSS licenses poses a logistical problem of keeping track of the restrictions and obligations imposed by the various OSS licenses.

OSS licenses have numerous terms. By way of example, one OSS license term may require that, if the software that is covered by that license is modified by the developer, the entire application (not just the code segment subject to the OSS license, but the entire application) must be published. Some terms may require publication of the source code in certain situations while other terms may require that the executable code be released for all to use subject to the certain license terms. Another OSS license term may require that, in certain situations, credit be given to the author of the code segment subject to the license. The variety of licenses is growing and the applicable terms are voluminous. Keeping track of the applicable obligations and restrictions is problematic.

BRIEF DESCRIPTION OF THE DRAWINGS

For a detailed description of illustrative examples, reference will now be made to the accompanying drawings in which.

DETAILED DESCRIPTION

Figure 1:
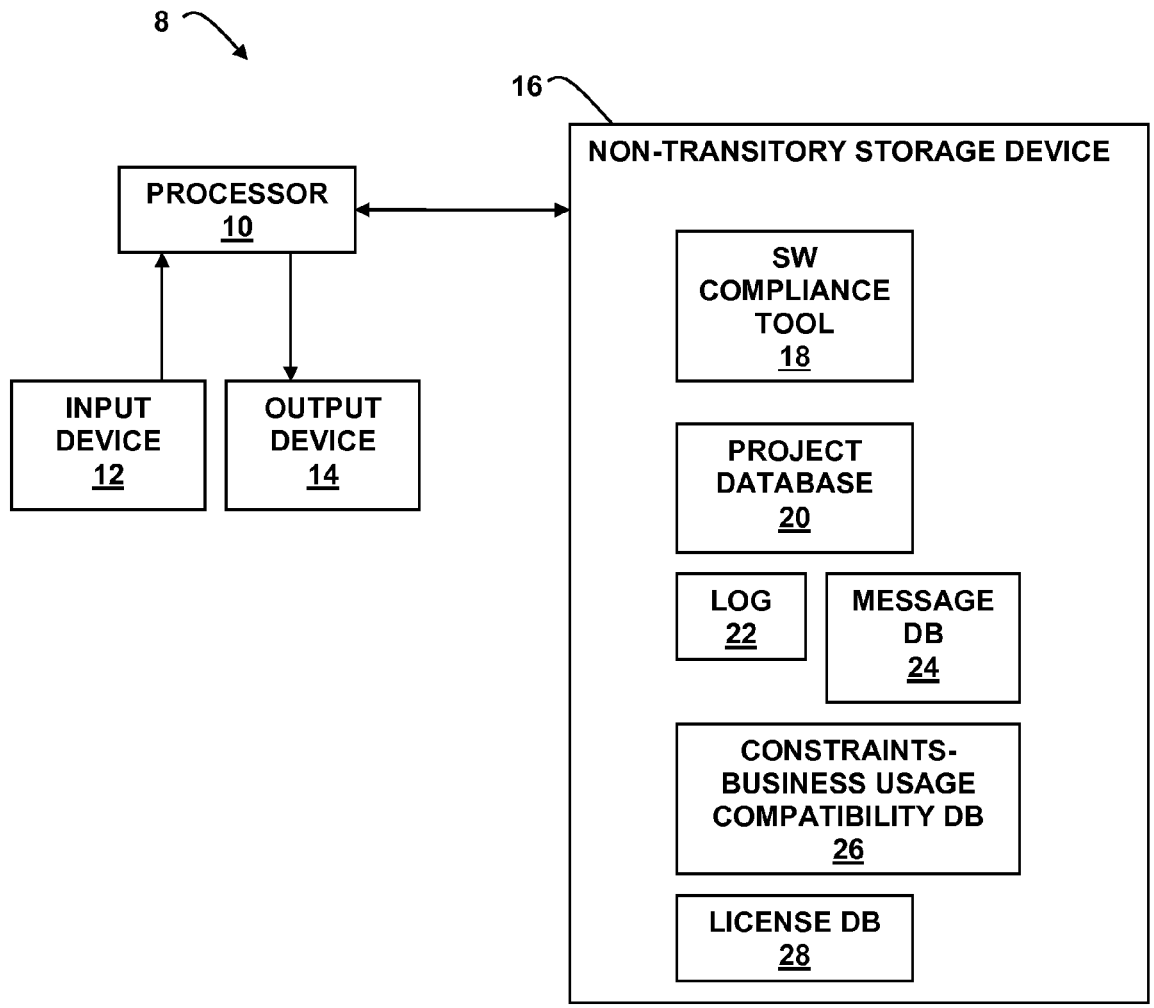
FIG. 1 shows a system in accordance with various examples.

FIG. 1 illustrates a system 8 that includes a hardware processor 10 (e.g., central processing unit, "CPU") coupled to an input device 12, an output device 14, and a non-transitory storage device 16. Although a single hardware processor 10 is shown in the example of FIG. 1, more than one hardware processor can be included in other examples. The input device 12 may include a keyboard, a mouse, a trackball, or combinations thereof. The output device 14 may include a display. A user interacts with the system of FIG. 1 via the input and output devices 12 and 14.

The non-transitory storage device 16 may include random access memory ("RAM"), a hard disk drive, a compact disc read-only memory ("CD ROM"), Flash storage, and other non-transitory storage devices. The storage device 16 stores a software compliance tool 18 that includes machine-readable instructions that may be executed by processor 10. Execution of the software compliance tool 18 by processor 10 causes the processor 10 to implement some or all of the functionality described herein. The storage device 16 may also include log data 22, a message database 24, a constraints-business usage compatibility database 26, and a license database 28.

The software compliance tool 18 permits a user to create a description of a software project. The project comprises a software application that has been or is being created by an author (e.g., a software developer). For ease of discussion, the project may be discussed herein in the future tense, but the software tool 18 can be used to analyze a software project that already exists as well.

The project to be created will include source code, some of which will be written by the author and some of which will include software components that the author will not create but will incorporated into the project nevertheless. For example, the author may download a particular software component, or multiple software components into the project. The use of such software components authored by a person other than the author of the project avoids the author from having to create a software component that already exists thereby streamlining the development of the software project. The term "software component" in this disclosure refers to a collection of machine-readable instructions that are to be used in a software project, but that may not be written by the author of the project.

One or more of the software components may be subject to a software license, sometimes referred to as an "open source software license." Such licenses permit the corresponding software component to be used but pursuant to certain restriction and constraints. Numerous different types of open source software exist or may be created in the future.

A restriction comprises a limitation on what can be done with the software component. Examples of restrictions that may be placed on a software component by way of its open source software license include:

A. Source code of the software component may not be modified

B. Source code may not be used for commercial use

C. Modifications to the source code are permitted and such modifications may be distributed in a form separate from the original source, such as a patch.

Different or other restrictions are possible as well.

A constraint includes an obligation that the author of the project must perform. A constraint is an affirmative action that the author must take, whereas a restriction is a forbidden action. Examples of constraints include:

A. Return back the modification of the software component.

B. Distribute the source code of the software component.

C. Give credit to the original author of the software component.

D. Re-license the resulting project with the same software license.

Different and/or additional constraints are possible as well. One type of constraint is called a "reciprocal constraint." A reciprocal constraint is a constraint obligation that applies in certain conditions that requires that the developer, who is using a software component, to contribute his work to the original author. For example, the constraint "return back to the author any modification to the original source code" is a reciprocal constraint, or "distribute/re-license the entire work under the same original license" is another reciprocal constraint.

A software license defines restrictions and constraints that may apply to one or more "objects." An object may comprise source code, binary code, a derivative software work, etc. In some implementations, the license database 28 includes one or more open source software licenses and the terms (e.g., restrictions and constraints) of such licenses. Each license may be stored in the database 28 in the form of an object class instantiation. As such, each license may include multiple objects interrelated to one or more other objects. In at least some implementations, a license is represented in the database 28 with four designations—"license," "object," "action," and "constraint." These designations permit the software compliance tool 18 to represent most, if not all, clauses in the various licenses. The designation "license" contains attributes such as name of the license, version, description, dates of validity, etc. The designation "object" defines objects in the license and on which the rules or terms of the license are applied. Examples of object include "source code," "binary code," "derivative works," and "license." Other types of objects can be defined. The designation "action" contains any action that is subject to the rules of the license itself. Examples of actions include "modify source code," "distribute," "link," "copy," "use," etc. If a particular action is allowed for a given object, a relationship will be specified in the database between the object and the action. The designation "constraint" represents the obligations required under the license. For a given license, the user of the software compliance tool 18 can specify which objects the license governs. This operation is performed via a user interface implemented by the software compliance tool 18. The user interface displays the various "license," "object," "action," and "constraint" information using, for example, a tree representation. The root of the tree is the license. The objects are displayed at the second level of the tree representation. The third level provides the permitted actions, and the fourth level of the tree provides the constraints associated to the action.

Figure 2:
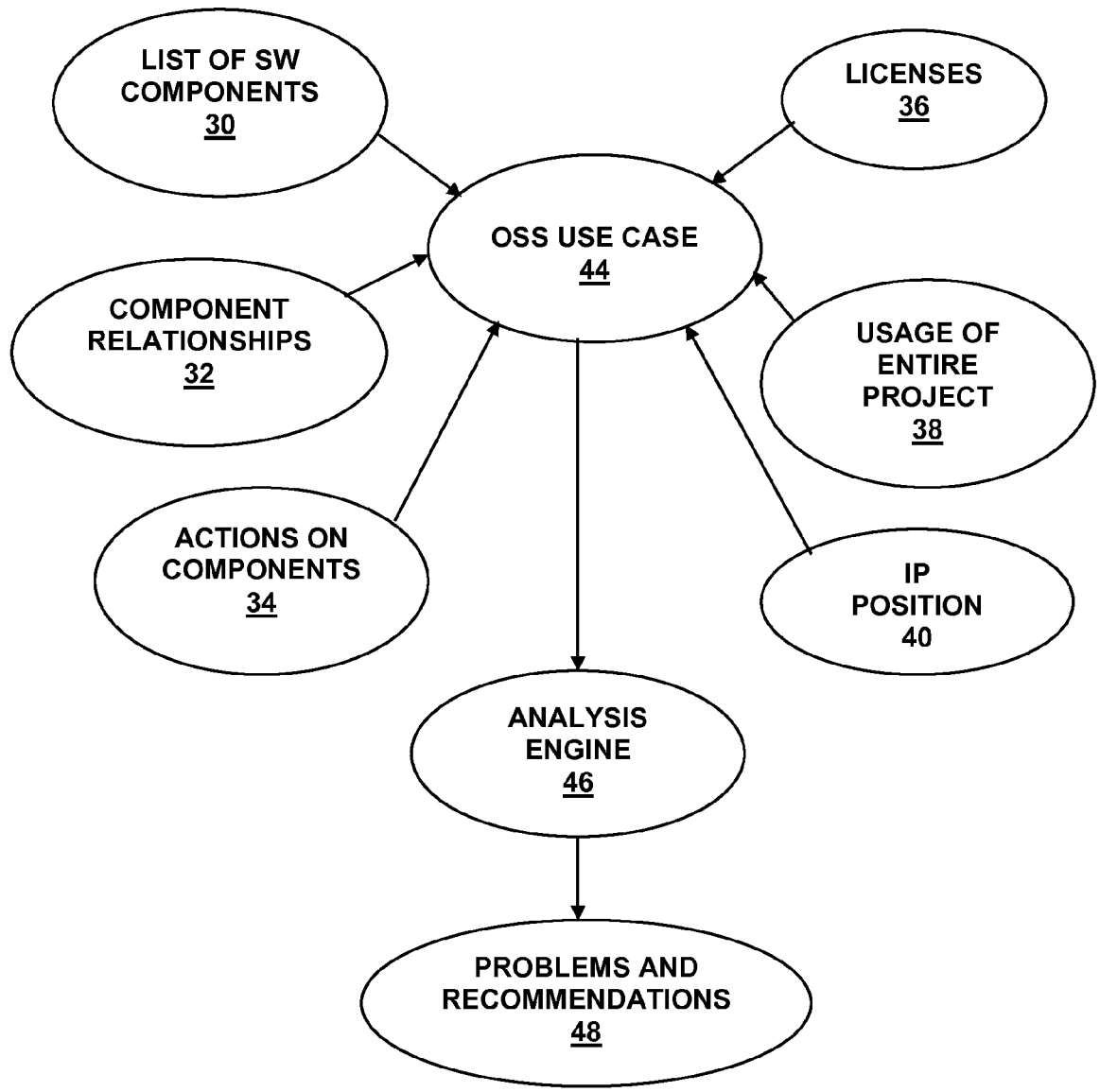
FIG. 2 depicts inputs to the usage definition of an application in accordance with various examples.

FIG. 2 illustrates the operation of the software compliance tool 18 to create and analyze an OSS "use case 44 for the project. The use case 44 for a given project defines how the project is intended to be used and which software components and associated open source software licenses will be used in the project. The OSS use case 44 is constructed from a number of inputs including one or more software components 30, component relationships 32, actions on the software components 34, OSS licenses 36, usage of the entire project 38, and an "intellectual property" (IP) position 40 for the project. The various inputs are provided by a suitable user interface implemented by the software compliance tool 18.

The list of software components 30 is input by, for example, selection from a menu of software component choices, by typing in the name of the software components, or by any other suitable manner. The component relationships 32 specify, for example, the manner in which each software component is related to the overall project. Examples of such relationships 32 include static linking and dynamic linking.

The actions on the software components 34 specify the manner in which the corresponding software component is to be implemented or has been implemented. Examples of software component actions include "modify," "link," and "use only." The modify action means that the author of the project intends to modify the software component's source code. The link action means that the author of the project intends to link the software component with, for example, a library. The use only action means that the author intends to incorporate the software component without modification into the project.

The licenses 36 identify the OSS licenses that control the use of the specified software components 30. The OSS licenses 36 may include known licenses (e.g., General Public License (GPL), Apache License 2.0, etc.) as well as future created licenses. Known licenses may be selected from a menu. Licenses can also be specified by typing the names of the licenses. Through a user interface, the user of the software compliance tool 18 is able to associate each software component 30 with a corresponding license 36. More than one software component 30 may be covered by (i.e., correspond to) the same license 36.

A user interface may be provided by which the various terms of the license may be specified by the user of the software compliance tool 18. Software licenses can include any of numerous possible terms. An illustrative example includes: if the source code is modified, the source code must be published; any project using the applicable software component must be relicensed under the same license terms as the license pertaining to the software component. Such licenses and license term information is stored in the storage device 16 in license database 28.

The project usage 38 input specifies how the project that includes the various software components 30 and associated license 36 is intended to be used and delivered. Project usage 38 may specify the business usage of the project. An example of a project's usage includes: the project is for internal use only (project will be used just by the author or the author's organization and will not be distributed or sold). Another project usage example includes: the project will be delivered to a customer. Such latter project usage may also specify whether the customer-delivered project may be resold by the customer or used only by the customer itself. A project usage input may also be that the project is to be used in a particular industry (e.g., military). Project usage information is stored in the project database 20.

The IP position 40 specifies some of the terms of the overall license to be imposed on the resulting project. Examples of IP positions include:

A. Re-licensing: specifies that the project is to be released under a proprietary software license.
B. Open artifact: specifies that the project is to be released under an open source software license.
C. Close artifact: specifies that the project is to be released with a proprietary license that controls any source code written by the author and, for software components that are incorporated into the project, such software components are controlled by their own OSS licenses.

Referring still to FIG. 2, once the OSS use case 44 is constructed by a user of the software compliance tool 18, an analysis engine 46 (which may be part of the tool 18 or a separate software application) then analyzes the use case to determine if any problems exist and, if so, provides one or more recommendations (48).

Figure 3:
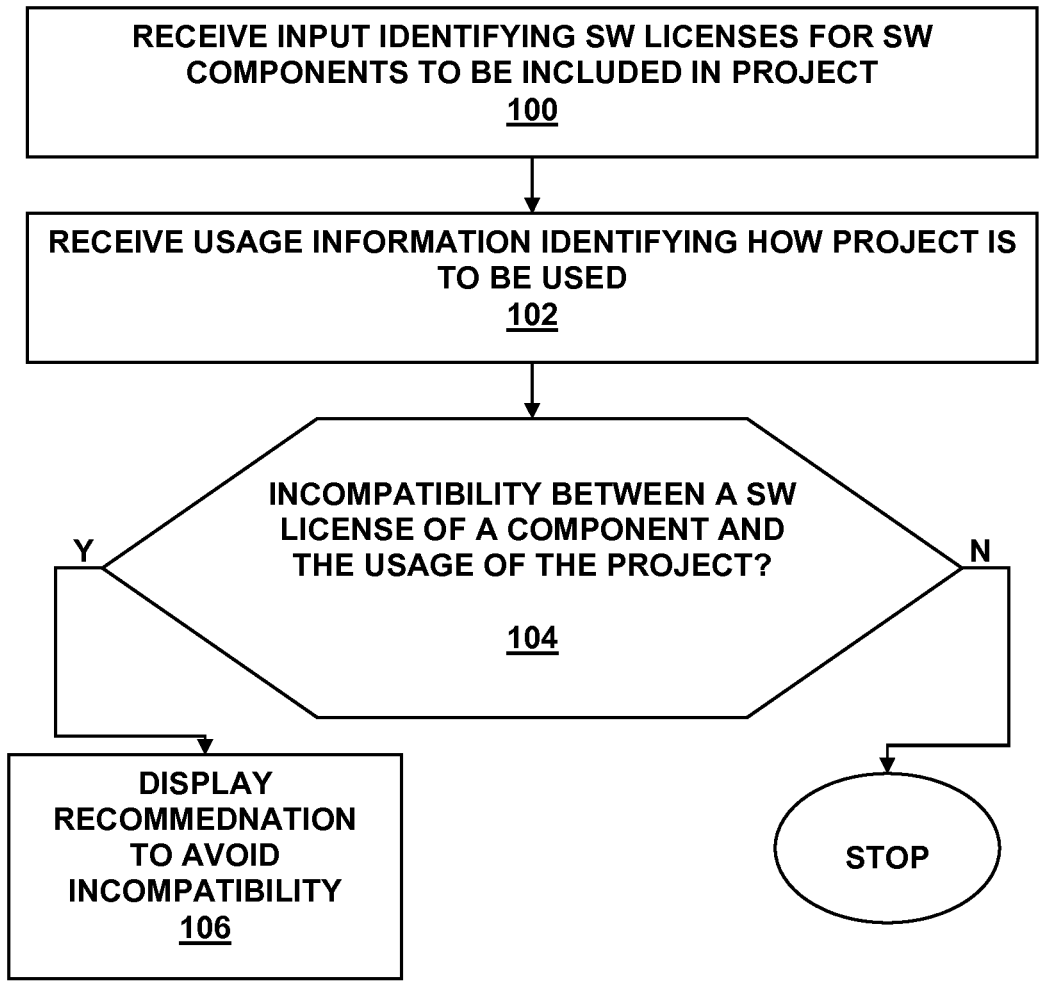
FIG. 3 shows a method in accordance with various examples.

FIG. 3 illustrates a computer-implemented method for how the software compliance tool determines problems and provides recommendations (48). The actions provided in FIG. 3 can be performed in an order different than that shown and two or more actions may be performed in parallel. The method of FIG. 3 may be performed by software compliance tool 18.

At 100, the method includes receiving input identifying software licenses for software components to be included in the project. At 102, the method includes receiving project usage information. Illustrative implementations of actions 100 and 102 are provided above.

At 104, the method determines whether an incompatibility exists between a software license of a software component included in the project and the overall usage of the project. This determination may be implemented in accordance with a variety of techniques. For example, a user of the software compliance tool 18 may have previously created a constraints-business usage compatibility database 26 (FIG. 1) and stored such database in the storage device 16. One example of such constraints-business usage compatibility database 26 includes a table that maps constraints to business usages. In one implementation, the constraints-business usage compatibility database 26 includes pairs of constraints and business usages that are incompatible. That is, each such pair specifies a business usage that is not compatible with a constraint that may be required by a given OSS license. For example, a constraint from an OSS license for one or more of the software licenses of the constituent software components may require publication of the project's source code, but the project's usage specifies that the project is to be delivered to a customer and thus is confidential to that customer and is not to be released publicly. In other implementations, the constraints-business usage compatibility database 26 includes constraint-business usage pairs that are compatible, and if a particular combination of business usage and constraint is not present in database 26, then such a combination is not permitted. The software tool 18 checks the database 26 to determine if any incompatibilities exist in the current project. The software tool 18 may also determine if an action specified to be performed on a software component (e.g., modify, link) is inconsistent with the open source software license governing that software component.

As noted above, system 8 of FIG. 1 also may include a message database stored in the storage device 16. The message database 24 includes one or more messages corresponding to one or more incompatibilities. Each message specifies a recommendation as to how the corresponding incompatibility can be resolved. The message database 24 includes alphanumeric character strings that can be displayed on output device 14 to provide feedback to the user of the software compliance tool 18 as to how to resolve one or more incompatibilities between intended business usages and OSS licenses for software components that are to be included in the project.

For example, an incompatibility might be that the business usage forbids the project from being published while one or more OSS licenses used in the project requires publication of the source code if the project is delivered from one party to another. The corresponding recommendation message from message database 24 may be: "Renegotiate with customer for customer to develop project internally with externally provided support service. Resulting project thus will not be delivered from one party to another and the resulting project will be used internally only by customer who created it." Another example of a recommendation message includes: "Applicable license inconsistent with intended project usage—consider renegotiating with customer to permit publication of project source code." Yet another example of a recommendation message includes: "Find an equivalent software component to component XYZ having a license that does not require public disclosure of project source code."

Referring again to FIG. 3, the method then comprises displaying (106) the recommendation message to avoid the incompatibility determined at 104. Otherwise, if no incompatibility is determined at 104, the method terminates at 108.

Figure 4:
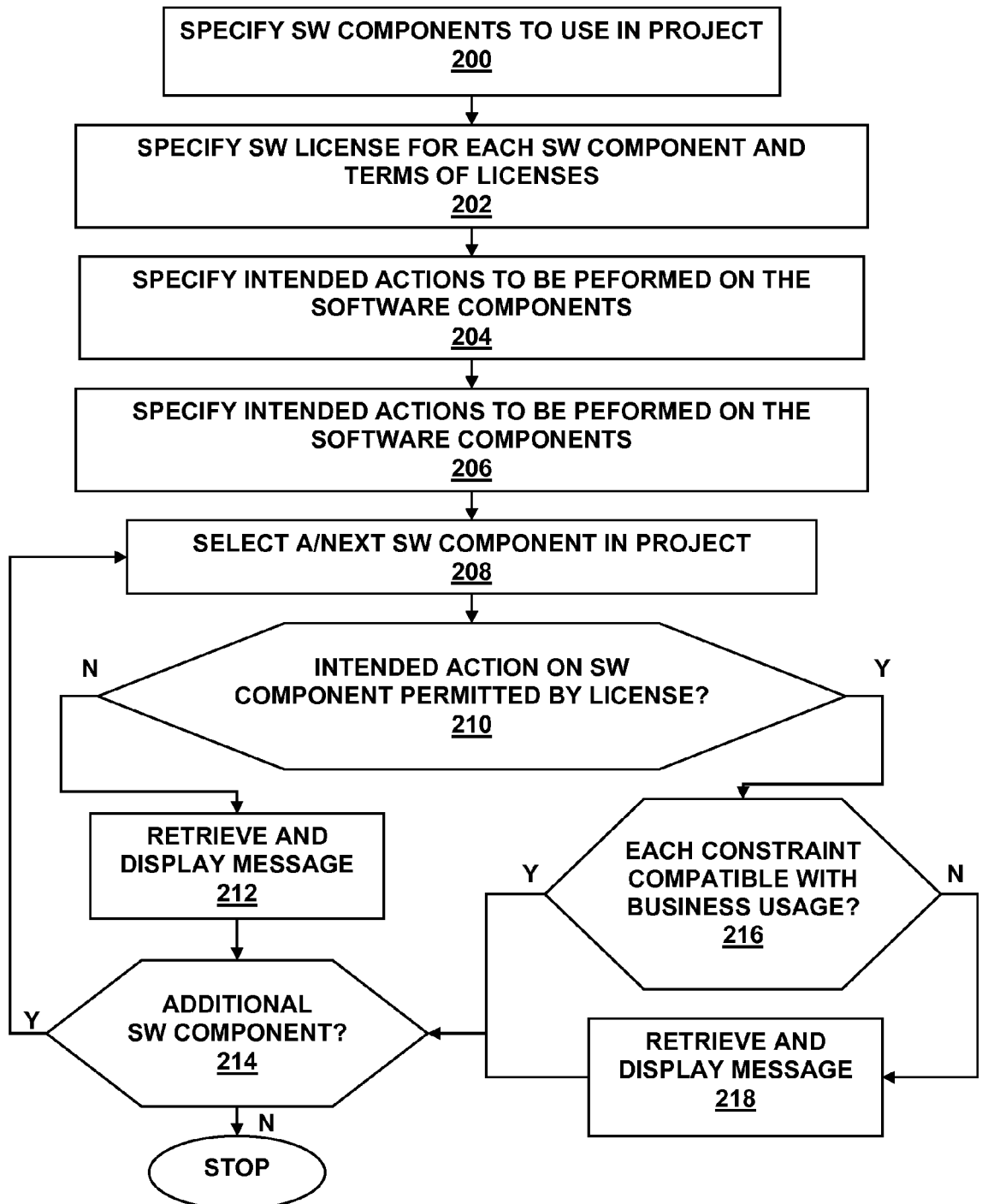
FIG. 4 shows another method in accordance with various examples.

FIG. 4 depicts another computer-implemented method performed by the software compliance tool 18 upon its execution by hardware processor 10. The actions provided in FIG. 4 can be performed in an order different than that shown and two or more actions may be performed in parallel. The method depicted in FIG. 4 provides, among other things, additional detail regarding the component usage analysis information 50 and constraint analysis information 52 depicted in FIG. 2. The method of FIG. 4 may be performed by software compliance tool 18.

At 200, the method includes specifying software components to use in the project. At 202, the method includes specifying a software license for each of the various software components specified at 200, as well as the terms of the licenses including any applicable constraints. In some embodiments, a given software component may have been used in a previous project and thus its applicable software license will have been designated in the former project. For such previously used software component, block 202 may include the software compliance tool 18 searching a repository of software component designations (e.g., project database 20) and their applicable software tools. At 204, the method includes specifying the intended actions to be performed on the various software components (e.g., modify, link, use only, etc.). If, for example, the action specified on the software component is "modify" (i.e., modification of the software component), the software compliance tool 18 may automatically add a new software component to the project that represents the derivative work of the original software component, and on this newly added software component, the user can specify the intended use. At 206, the business usage for the project is specified. Such actions are discussed above as well.

The remaining actions depicted in the method of FIG. 4 include the analysis of the various software components in relation to the business usage for the project. At 208, a software component specified at 200 is selected to be analyzed. At 210, the method determines whether the intended action for that software component (specified at 204) is permitted by the software license pertaining to that particular software component. If the action is not permitted, then at 212 the method comprises retrieving and displaying a message from the message database 24. The message may identify that a problem exists and provide a recommendation as to how to remedy the problem. For example, the message may be that the intended modification to the software component is not permitted by the applicable software license and that the problem can be remedied by changing the action specified for that software component to "use only" (i.e., no modification). If an additional software component remaining to be analyzed exists (214), then the method loops back to 208; otherwise, the method terminates.

If the intended action (210) is permitted by the applicable software license, then control passes to 216. At 216, the method includes, for each constraint specified by the applicable software license for the software component, determining whether each such constraint is compatible with the business usage specified for the project at 206. Constraints-business usage compatibility database 26 is used for this purpose as explained above.

If the business usage and constraint are compatible as determined at 216, then control passes to 214 at which the method determines if an additional software component in the project remains to be analyzed. If the business usage and constraint are not compatible as determined at 216, then the method retrieves (at 218) an applicable message from message database 24 which provides a recommendation as to how to remedy the incompatibility, and control then passes to 214.

In at least some implementations, all incompatibilities and recommendation messages determined for the given project are stored in log 22 for subsequent viewing.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A non-transitory storage device storing instructions that, when executed by a hardware processor, causes the hardware processor to:
   receive, from an input device, input identifying software licenses for software components to be included in an application;
   receive, from the input device, usage information identifying how the application is to be used including at least one of: an industry in which the application is to be used, whether the application will only be used by an organization that owns the application, whether the application will be used by a third party, and whether the application may be resold by the third party;
   determine whether an incompatibility exists between any of the software licenses for the software components and the usage information as well as an overall license assigned to the application; and
   based on a determination of the existence of an incompatibility, display a recommendation as to how to avoid the incompatibility.

2. The non-transitory storage device of claim 1 wherein the usage information comprises at least one of:
   an indication that the application is for internal use only; and
   an indication that the application will be delivered to a third party for use by the third party.

3. The non-transitory storage device of claim 1 wherein the instructions, when executed by the hardware processor, cause the processor to determine whether an incompatibility exists by comparing terms in the software licenses for the software components to terms in the overall license agreement.

4. The non-transitory storage device of claim 1 wherein the instructions that, when executed by the hardware processor, determine whether an incompatibility exists comprise instructions that, when executed by the hardware processor, cause the hardware processor to determine whether a publication term of a software license is inconsistent with usage information of the application.

5. The non-transitory storage device of claim 1 wherein the instructions that, when executed by the hardware processor, display a recommendation comprise instructions that, when executed by the hardware processor, display a message indicating that consideration should be given to renegotiating with a customer to permit publication of application.

6. The non-transitory storage device of claim 1 further comprising instructions that, when executed by the hardware processor, cause the hardware processor to associate each of a plurality recommendation messages with each of a corresponding incompatibility.

7. The non-transitory storage device of claim 1 further comprising instructions that, when executed by the hardware processor, cause the hardware processor to store constraints-business usage compatibility information in a database, said constraints-business usage compatibility information indicative of which constraints are compatible with certain business usages.

8. A method, comprising:
   receiving, from an input device, input identifying software licenses for software components to be included in an application;
   receiving, from the input device, usage information identifying how the application is to be used including at least one of: an industry in which the application is to be used, whether the application will only be used by an organization that owns the application, whether the application will be used by a third party, and whether the application may be resold by the third party;
   determining, by a hardware processor, whether an incompatibility exists between any of the software licenses for the software components and the usage information as well as an overall license assigned to the application; and
   based on a determination of the existence of an incompatibility, displaying a recommendation by the hardware processor as to how to avoid the incompatibility.

9. The method of claim 8 wherein the usage information comprises at least one of:
   an indication that the application is for internal use only; and
   an indication that the application will be provided to a third party for use by the third party.

10. The method of claim 8 wherein determining whether an incompatibility exists by comparing terms in the software licenses for the software components to terms in the overall license agreement.

11. The method of claim 8 wherein determining whether an incompatibility exists comprises determining whether a publication term of a software license is inconsistent with usage information of the application.

12. The method of claim 8 wherein displaying a recommendation comprises displaying a message indicating that consideration should be given to renegotiating with a customer to permit publication of application.

13. A non-transitory storage device storing instructions that, when executed by a hardware processor, causes the hardware processor to:
   receive, from an input device, input identifying software licenses for software components to be included in a project;
   receive, from the input device, actions intended to be performed on the software components;
   receive, from the input device, usage information identifying an intended business usage of the project;
   determine whether an incompatibility exists between a specified action for each software component and a software license corresponding to said software component;
   determine whether an incompatibility exists between a constraint for each software license and a business usage as well as an overall license assigned to the application; and
   based on a determination of the existence of an incompatibility, display a recommendation as to how to avoid the incompatibility.

14. The non-transitory storage device of claim 13 wherein the usage information comprises at least one of:
   an indication that the application is for internal use only; and
   an indication that the application will be delivered to a third party for use by the third party.

15. The non-transitory storage device of claim 13 wherein the instructions that, when executed by the hardware processor, determine whether an incompatibility exists between a constraint for each software license and a business usage, comprise instructions that, when executed by the hardware processor, cause the hardware processor to determine whether a publication term of a software license is inconsistent with usage information of the application.

16. The non-transitory storage device of claim 13 wherein the instructions that, when executed by the hardware processor, display a recommendation comprise instructions that, when executed by the hardware processor, display a message that an equivalent software component should be found having a license that does not require public disclosure of project source code.

17. The non-transitory storage device of claim 13 further comprising instructions that, when executed by the hardware processor, cause the hardware processor to associate each of a plurality recommendation messages with each of a corresponding incompatibility.

\* \* \* \* \*